United States Patent
Lüders

(10) Patent No.: US 6,311,074 B1
(45) Date of Patent: *Oct. 30, 2001

(54) BASE STATION AND METHOD FOR COVERING A CELL OF A CELLULAR MOBILE RADIOTELEPHONE SYSTEM

(75) Inventor: Christian Lüders, Haar (DE)

(73) Assignee: Siemens Aktiengesellschaft, Munich (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/269,017

(22) PCT Filed: Sep. 5, 1997

(86) PCT No.: PCT/EP97/04841

§ 371 Date: Mar. 17, 1999

§ 102(e) Date: Mar. 17, 1999

(87) PCT Pub. No.: WO98/12889

PCT Pub. Date: Mar. 26, 1998

(30) Foreign Application Priority Data

Sep. 17, 1996 (DE) .............................. 961 14 902

(51) Int. Cl.$^7$ .................................................. H04B 1/38
(52) U.S. Cl. .......................................... 455/561; 455/525
(58) Field of Search ................................ 455/524, 561, 455/560, 525, 526, 446, 447, 436, 438, 517, 132, 133, 134; 370/331, 332, 333, 334; 375/267, 349, 347

(56) References Cited

U.S. PATENT DOCUMENTS

| | | | | |
|---|---|---|---|---|
| 4,932,049 | * | 6/1990 | Lee | 455/438 |
| 5,067,147 | * | 11/1991 | Lee | 455/436 |
| 5,193,109 | * | 3/1993 | Chien-Yeh Lee | 455/436 |
| 5,243,598 | * | 9/1993 | Lee | 370/332 |
| 5,479,397 | * | 12/1995 | Lee | 370/331 |
| 5,504,936 | * | 4/1996 | Lee | 455/436 |
| 5,504,937 | * | 4/1996 | Kangas | 455/453 |
| 5,542,107 | | 7/1996 | Kay | 455/513 |
| 5,625,876 | * | 4/1997 | Gilhousen et al. | 370/331 |
| 5,678,186 | * | 10/1997 | Lee | 455/437 |
| 5,752,161 | * | 5/1998 | Jäntti et al. | 455/561 |
| 5,844,898 | * | 12/1998 | Tanoue | 455/526 |

FOREIGN PATENT DOCUMENTS

| | | | |
|---|---|---|---|
| 43 43 765 | 6/1995 | (DE) . | |
| 92/17954 | 10/1992 | (WO) | H04J/3/16 |
| 95/06369 | 3/1995 | (WO) | H04B/7/26 |
| 95/17798 | * 6/1995 | (WO) | H04Q/7/36 |

* cited by examiner

*Primary Examiner*—William Trost
*Assistant Examiner*—Rafael Perez-Gutierrez
(74) *Attorney, Agent, or Firm*—Bell, Boyd & Lloyd LLC

(57) ABSTRACT

A base station is provided that contains at least one combination means to which at least two base station branches are connected for covering a cell. The transmission quality for a communication connection is monitored for each base station branch and base station branches are correspondingly activated or, respectively, deactivated for this communication connection in both transmission directions. The invention also can be realized in base stations that include sector antennas for covering a cell. The invention is particularly suited for utilization in cellular mobile radiotelephone systems; for example, the GSM mobile radiotelephone system.

18 Claims, 4 Drawing Sheets

Figure 1:
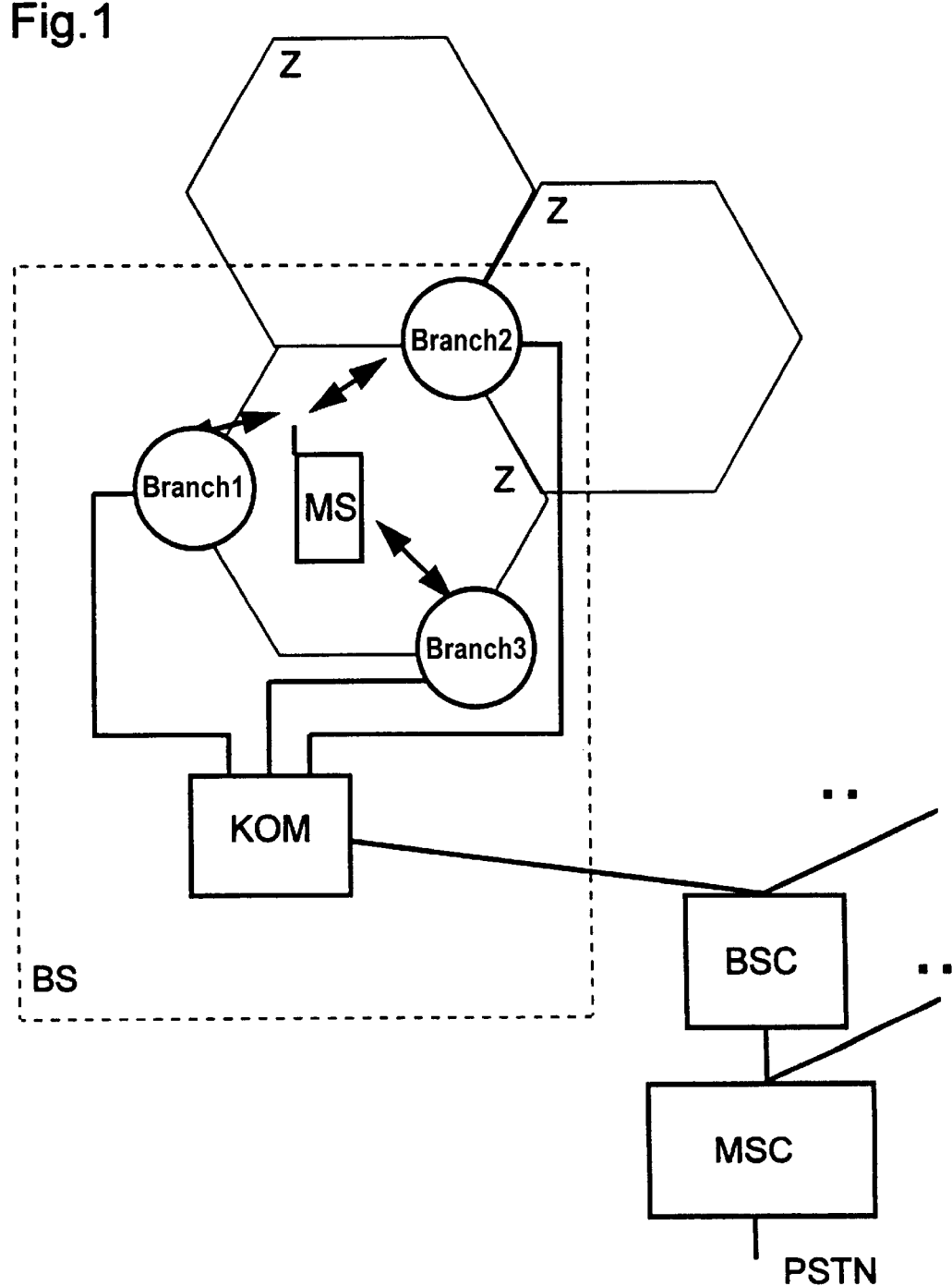

Branch 1 — ts 1, ts 2
Branch 2 — ts 1, ts 2
Communication Connection
free ts there would be 3 connections at ts 1: ZBW=0
there would be 5 connections at ts 2: ZBW>0
=> allocation of ts 1

Branch 1 — ts 1, ts 2
Branch 2 — ts 1, ts 2
Communication Connection no allocation of ts 1,
since otherwise ZBW too high in Branch 2

BASE STATION AND METHOD FOR COVERING A CELL OF A CELLULAR MOBILE RADIOTELEPHONE SYSTEM

The invention is directed to a base station for communication connections to mobile stations via radio interfaces and to a method for covering a cell of a cellular mobile radiotelephone system.

Mobile communication systems, for example mobile radiotelephone systems such as the GSM (Global System for Mobile communication) mobile radiotelephone system, enable the setup of communication connections from and to mobile subscribers in that information are transmitted via a radio interface. Various methods for separating the subscribers can be utilized on the radio interface, including time-division multiplex and frequency-division multiplex methods.

In mobile radiotelephony, the information on the radio interface are transmitted with electromagnetic waves. After the transmission over the radio interface, only a part of the energy is absorbed by the reception antenna of the receiving radio station. In a typical use environment of a mobile communication system, the transmitted information are subject to various disturbances on the radio interface. The information send from the transmitting station reach a receiving station over various propagation paths, so that the signal components of various propagation paths superimpose at the receiving station. Moreover, occlusions can considerably impede the transmission of information from a transmitting station to the receiving station. Interferers in the frequency band of the respective communication connection also lead to a deterioration of the quality of the received signals.

European Letters Patent 0 617 861 B1 discloses a method for improving the radio cell illumination in a cellular mobile radiotelephone system. In this method, the information of a communication connection are transmitted to a mobile station with a single carrier frequency from a plurality of radio stations, typically three branches of a base station, at the edge of a cell to be covered. The signals of the individual branches superimpose at the mobile station and thereby lead to an improvement in the quality of the communication connection. The signals sent from the mobile station are received by all branches of the base station covering the cell and are subjected to a diversity-combination method. The connection from the mobile station to the base station can thus also be improved.

However, a considerable outlay arises due to this configuration of a base station since, compared to a base station that comprises an omnidirectional characteristic in the middle of a cell or compared, too, to conventional sector cells, triple the number of transmission and reception devices must be offered. An improvement of the transmission quality is thus only possible with a greatly increased circuit-oriented outlay, so that the method is very expensive for a mobile radiotelephone network operator.

The invention is based on the object of specifying a base station and a method for covering a cell of a cellular mobile radiotelephone system that, upon retention of the advantages of the multiple connection, reduce the outlay for covering a cell. This object is achieved by the base station according to the features of patent claim 1 and by the method according to the features of patent claim 11. Advantageous developments can be derived from the subclaims.

According to the invention, a base station for communication connections to mobile stations via radio interfaces contains at least one combination means.

At least two base station branches for the coverage of a cell are connected to this combination means. The combination means is provided for monitoring the transmission quality for a communication connection between a mobile station and the at least two base station branches. Corresponding to the identified transmission quality for a communication connection, the combination means undertakes an activation or, respectively, deactivation of further base station branches. The activation or, respectively, deactivation ensues in both transmission directions. When a base station branch is add [sic], then the information transmission between this base station branch and the mobile station in both directions for said communication connection ensues in addition to the information transmission that is already ensuing via the previously activated base station branches.

As a result of the flexible cut-in or, respectively, out of additional base station branches, the transmission quality can be improved or, respectively, it is possible to reduce the outlay for base station branches required for a communication connection given adequate transmission quality. No separation of the two transmission directions thereby ensues; rather, both transmission directions are switch [sic] in common. It is thereby possible to release a transmission and reception unit in a base station branch. The evaluation and [sic] of the monitored transmission quality and the triggering of the cut-in or, respectively, out of branches can also be initiated by a control means outside the combination means. A signal combination, for example addition, and distribution of the reception signals of the individual branches always advantageously occurs in the combination means.

The identify [sic] transmission quality is checked overall for the individual branches and for the communication connection. Which branches are required for assuring an adequate transmission quality and which are not required can thus be determined. The corresponding branches are activated or, respectively, deactivated for the connection under consideration. The activation and deactivation ensues in both transmission directions. The transmission and reception equipment that have been released at the deactivate [sic] branch can be used for a communication connection of a different mobile station due to the release in both transmission directions; i.e. transmission and reception equipment are not reserved at all branches during the existence of a communication connection but are dynamically cut in or, respectively, out as needed. It is thus possible to better utilize transmission and reception equipment, i.e. undertake savings, upon retention of the advantages of multiple coverage.

Upon employment of standard radio propagation models and of the model of the reception power addition in the signal combination, the percentage of connections that require additional branches (for example, reception level lower than the average level in the cell) and wherein the additional branches effect a substantial improvement of the reception conditions (for example, reception level improvement of more than 1 dB) was found by simulations. As a typical result, one thereby obtains:

Connections with one branch: 65%,
Connections with two branches: 25%, and
Connections with three branches: 10%.

The average number of branches per connection is thus 1.45. Only about 1.5 instead of three branches are thus needed on average and a savings of 50% for transmission and reception equipment can be realized by the inventive base station.

In the inventive base station, a base transmission/reception station or sector antenna that was disconnect [sic]

for a communication connection is cutted [sic] in on a different carrier frequency for a further communication connection. As a result of this design, an improved utilization of the transmission and reception equipment of the base station and an improved utilization of the system resources for the purpose of enhancing the network capacity derive. The transmission equipment of a base station are advantageously fashioned such that a switching of the carrier frequency is possible related to time slots given a time-division multiplex method. A dynamic allocation of a logical channel [sic] to a physical channel thus ensues for each time slot.

In the inventive base station, the base station branches are formed by base transmission/reception stations that are respectively arranged at the edge of the cell or, alternatively, by sector antennas to which different sectors of a cell are allocated. In the former instance, the base transmission/reception stations have an emission diagram directed to the center of the cell, whereas the emission diagram respectively points to the cell edge given sector antennas that can be generated both by separate antennas as well as by an electronic modulation.

As a result of the second instance, the division of a radio cell into a plurality of narrow sectors, the signal quality can be improved in that common channel interference is only received at the base station in a small angular range (for example, be selecting the sector with the best reception). Further, the base station broadcasts less interference fort other communication connections since the transmission signal is not sent in all directions but targeted. By dynamically connecting and disconnecting transmission and reception equipment at the respective branches, it is thereby also possible to undertake savings upon retention of the sectorization.

According to an advantageous development of the inventive base station, this is operated according to the time-division multiplex method, whereby the activation and deactivation of a base station branch—of a base transmission/reception station or of a sector antenna—is controlled related to time slot with respect to a communication connection.

Given mobile radiotelephone systems as field of employment of the base station, protective times during which the transmission power of the transmission station is reduced are provided between the time slots according to the time-division multiplex method. These protective times between two time slots are particularly suited for switching since the interfering effects of the switching have only a slight negative influence on the transmission quality given reduced transmission power.

According to another advantageous development, the monitoring of the transmission quality is cyclically repeated. The monitoring of the transmission quality can be enabled in that transmission parameters such as the signal level, the signal-to-noise ratio or the ratio of payload signal to noise signal for a communication connection is measured in every individual branch or in that the bit error rate for every individual branch is identified at regular time intervals in the combination means or at time intervals induced by the transmission quality. The monitoring, however, can also be limited to individual branches or, respectively, the transmission quality of all branches is determined as a whole.

When the maximally possible plurality of base station branches has not been added in for a connection at the monitoring time, the combination means can control that additional base station branches are involved into the communication connection for the purpose of monitoring the transmission quality.

Advantageously, the coverage of a mobile station by a plurality of base station branches ensues on a common carrier frequency. A plurality of base station branches—base transmission/reception stations or sector antennas—thus transmit on a common carrier frequency during a time slot, so that the signal components superimpose at the mobile station, and an improvement of the reception is possible without added outlay at the mobile stations. As a result of this development, a modification of the base station can ensue without requiring an adaptation of the mobile stations.

The base stations comprise at least one organization channel whose carrier frequency—according to an advantageous development—is preferably used for communication connections that are covered by a plurality of base stations branches. Since the organization channel is made available by all base station branches independently of the usage condition of the cell, the carrier frequency of this organization channel can be advantageously used for communication connections that occupy a great number of branches. Such a procedure makes it possible to reduce the plurality of required carrier frequencies per base transmission/reception station or sector antenna in load-dependent fashion.

Advantageously, these physical channels can be switched between a combination means and a branch, as a result whereof only the plurality of physical channels actually required is also switched between combination means and base transmission/reception station or sector antenna.

A method for covering a cell of a cellular mobile radio-telephone system is recited in an independent claim.

The inventive base station or, respectively, the method for supplying a cell is explained in greater detail below on the basis of exemplary embodiments with reference to the Figures.

Figure 2:
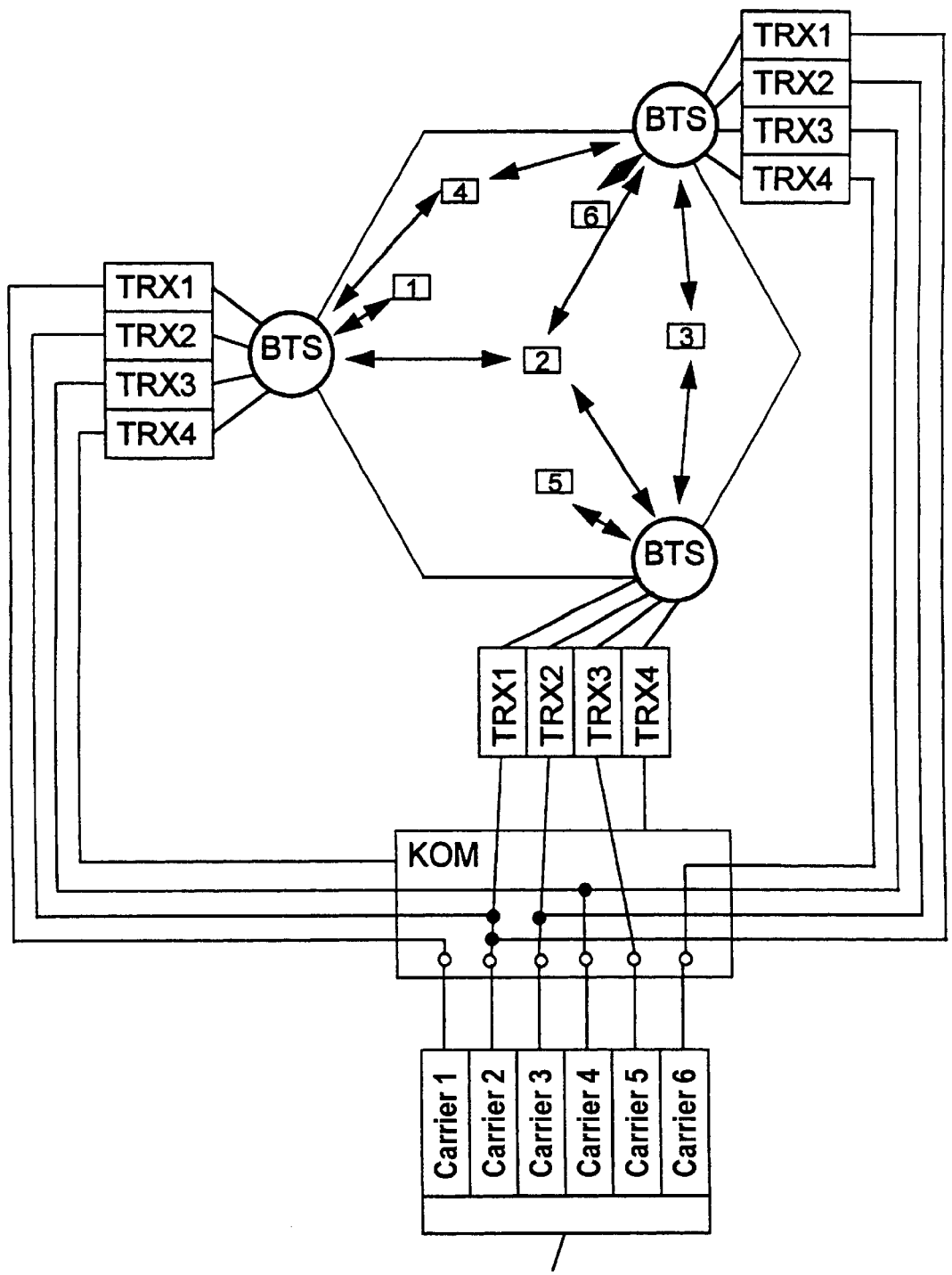
Figure 3:
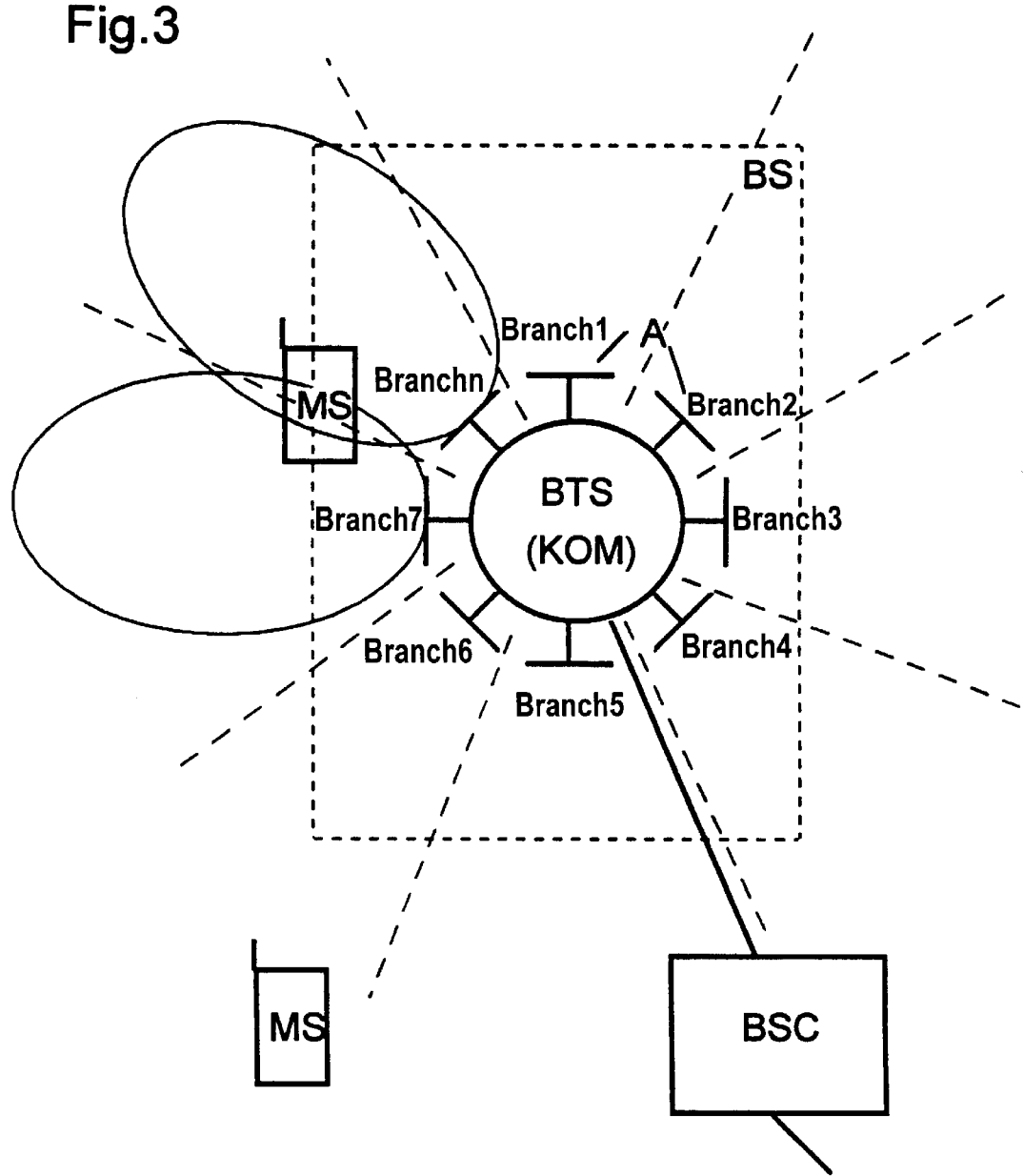
Figure 4:
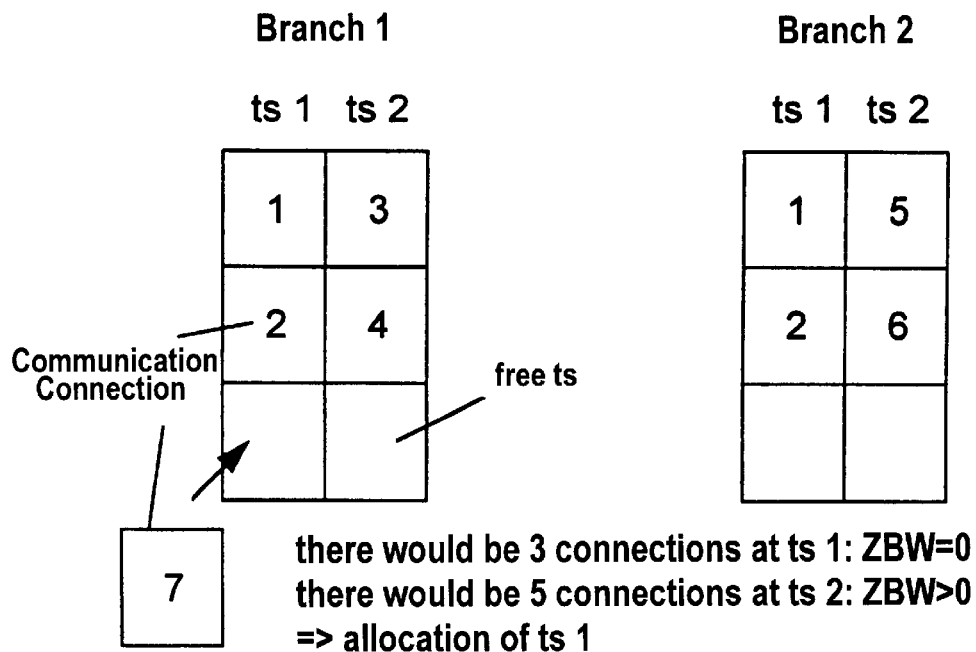
Figure 5:
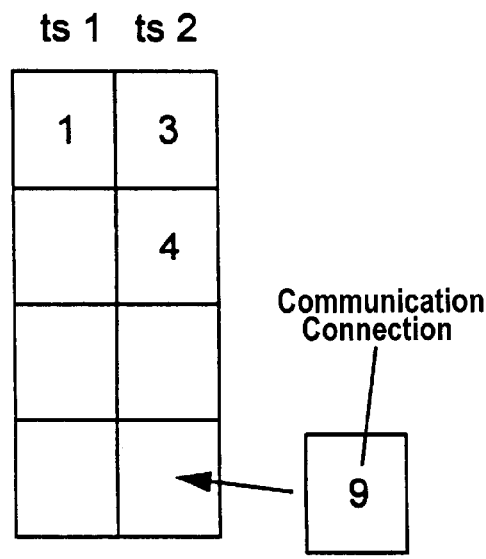

Thereby shown are:

FIG. 1 a block circuit diagram of the cellular mobile radiotelephone system;

FIG. 2 a block circuit diagram of a base station with three base station branches for covering a cell;

FIG. 3 a block circuit diagram of a base station with allocated sector antennas;

FIG. 4 a radio interface with two time slots and four carrier frequencies given two branches; and FIG. 5 a radio interface with two time slots and three carrier frequencies given two branches.

The mobile communication system shown in FIG. 1 comprises at least one mobile switching center MSC that is networked with further mobile switching centers or, respectively, produced the access to a public switched telephone network PSTN. Further, this mobile switching center MSC is connected to at least one base station controller BSC. Each base station controller BSC in turn enables a connection to at least one combination means KOM. The mobile switching center MSC and the base station controller BSC are arrangements as known, for example, from the GSM mobile radiotelephone system.

The combination means KOM, for example, is connected to three base station branches Branch1 through Branch3. These base station branches Branch1 through Branch3, for example, are radio stations that can set up a communication connection to mobile stations MS via a radio interface. One such radio connection to a mobile station MS is shown by way of example in FIG. 1.

The radio interface between base station branches Branch1 through Branch3 and mobile station MS is organized according to the time-division multiplex method. For example, eight time slots that can be utilized for various communication connections and for organization of the radio interface are thus offered on a carrier frequency. Details regarding the organization of the radio interface can be derived, for example, from M. Mouly, M. B. Pautet, "The GSM System for Mobile Communications", 1992. The radio interface, further, is optionally organized according to the frequency-division multiplex method, so that communication connections to mobile stations MS can be set up from one radio station on a plurality of carrier frequencies. A radio channel, accordingly, is characterized by its carrier frequency and by the time slot.

According to FIG. 1, three base station branches Branch1 through Branch3 connected to a shared combination means KOM are arranged at the edge of a cell Z of the cellular mobile communication system having a plurality of cells Z. The base station branches Branch1 through Branch3 can thus assure a communication connection to a mobile station MS in common, i.e. simultaneously and with high quality. The combination means KOm and the base station branches Branch1 through Branch3 form a base station BS that can repeat corresponding to the cell structure of the mobile communication system.

The base station BS of FIG. 2 receives, for example, information on six different carriers, i.e. a maximum of six communication connections to mobile stations can exist with reference to a time slot. These six different carriers, which correspond to physical channels, are conducted to the combination means KOM. This combination means KOM switches the physical channels onto individual branches that are realized by base transmission reception stations BTS.

For example, three base transmission/reception stations BTS—alternatively, it could also be a matter of two base transmission/reception stations or a plurality of base transmission/reception stations—are arranged at the edge of a common cell and cover, for example, six mobile stations identified by numerals. In order to simultaneously cover six mobile stations during a time slot with all base transmission/reception stations BTS, it would be necessary to offer transmission and reception equipment TRX for six different carrier frequencies on all base transmission/reception stations.

Inventively, however, a smaller plurality of transmission and reception equipment TRX1 through TRX4 is offered—four in FIG. 2. The plurality of transmission and reception equipment per base station branches [sic] is greater than 1 but lower than the network-side plurality of physical channels up to the combination means KOM.

The physical channels between the base station branches and the combination means KOM can be switched by the combination means KOM. As a result thereof, it is possible also to secure six communication connections during a time slot with the—for example—four transmission and reception equipment TRX1 through TRX4 per base transmission/reception stations [sic] BTS. The mobile stations 1, 5, 6 that are located close to an individual base transmission/reception station BTS are covered exclusively by this base transmission/reception station BTS, whereas other mobile stations 3, 4 are covered by two base transmission/reception stations BTS or a further mobile station 2 is covered by three base transmission/reception stations BTS.

The plurality of transmission and reception equipment that are to be provided for each base station branch in the network planning can be determined with theoretical methods of message traffic. The load per base station branch, i.e. the diversity branch of a communication connection, can be determined from the expected traffic for a cell and from the maximally permitted blocking rate. This load can be modelled insofar as the average for example between 1.2 and 1.5. The load per branch, however, is dependent on the specific conditions of an individual cell, so that a certain security span is to be planned in. The plurality of required transmission and reception equipment per base station branch can then be determined from the load per The connection or, respectively, disconnection of base station branches (physical channels to the transmission and reception equipment of these branches) ensues with the combination means KOM according to the transmission quality for this communication connection overall and on the individual branches.

A required transmission quality within the mobile communication system is usually defined, this being derivable on the basis of the reception level, the bit error rate, the signal-to-noise ratio, the relationship of payload signal to noise signal or, respectively, a combination of these measured quantities. When the transmission quality falls below a first threshold, then the combination means KOM can initiate the connections [sic] of a further base station branch for this communication connection. On the other hand, the combination means KOM disconnect [sic] a base station branch—advantageously, that with the poorest transmission quality—from the communication connection when a second threshold with respect to the transmission quality is exceeded or, respectively, when it makes no significant contribution to the signal quality.

The base station BS has sector antennas A that emit transmission signals or, respectively, pick up reception signals as antenna devices allocated to it. The sector antennas A form the base station branches Branch1 through Branchn and are each thereby respectively directed such that the cell that surrounds the base station BS is divided into various sectors. The sectors of the individual sector antennas A thereby overlap, so that a communication connection to a mobile station MS is possible via at least two sector antennas A. The sector antennas A can likewise be fashioned as one antenna or a plurality of antennas with electronic excursion of the emission diagram.

As a result of this sectorization of a cell of a cellular mobile radiotelephone system, it is possible the reduce the emitted and received noise power, as well as to use the same carrier frequency of a base station BS for different mobile stations MS that can be distinguished from one another by their direction with reference to the base station BS. In order to assure this, the sector antennas A are connected to individual transmission and reception devices that are in turn connected to the combination means KOM. The cut-in of branches—represented by sector antennas A—to the network-side, physical channels from and to the base station controller BSC ensues via the combination means KOM.

Given this base station BS, too, it is possible according to the invention to reduce the number of required transmission and reception devices per sector antenna A due to the utilization of the combination means KOM, since sector antennas A that are not required at a transmission and reception device are disconnect [sic] from a communication connection and are thus available for further communication connections.

Inventively, it is advantageous that the transmission and reception devices of the base stations BS according to FIG. 2 and FIG. 3 can be switched to different carrier frequencies in time slot-related fashion. The frequency resources within a cell are thus utilized better and a high network capacity is realized with the available frequency band.

The criteria on the basis whereof, for example, an allocation of a time slot ensues for a communication connection and how a regrouping of the communication connections can advantageously ensue is explained on the basis of FIGS. 4 and 5. A base station branch is referred to below as branch for covering a mobile station MS.

The probability that a transmission and reception device for the corresponding time slot is not available for an existing communication connection that requires an additional branch should be kept as low as possible. This possibility is referred to below as cut-in blocking probability in order to distinguish it from the setup blocking probability (probability that the required branches are not available at call setup).

The minimization of the cut-in blocking probability should advantageously have precedence over a minimization of the setup blocking probability in order to secure existing communication connections with adequate quality.

The goal of keeping both probabilities low can be achieved by:

a suitable time slot allocation strategy in the connection setup, and
 a shift of existing connections onto other time slots.

At the beginning (for example, a few seconds) of a communication connection, this is covered by several or all, for example three branches. Due to the measurements of the respective reception levels and/or qualities (bit error rates) what branches are required for covering the communication connection are thereby determined. Further, a new time slot can be sought for this communication connection, so that the cut-in blocking probability given the shift to this time slot is as low as possible, and the communication connection can be shifted onto this time slot. Optionally, the old channel can also be retained when the cut-in blocking probability was therewith low, for example lower than an adjustable threshold or not much higher than the new cut-in blocking probability.

The cut-in probability ZBW is dependent on various quantities:

on the plurality of non-occupied transmission and reception devices for the appertaining time slot.

What thereby counts is not only how many transmission and reception devices remain at the branches being used but also branches not currently required by the communication connection; see FIG. 4 with respect thereto.

on the probability that the connections already existing on the respective time slot require a new (additional) branch.

When a communication connection already uses all branches, then the probability that additional branches are required is equal to zero; on the contrary, a probability that a branch can be released exists for these communication connections. Time slots that already service a plurality of such communication connections are therefore to be preferred.

When a very good transmission quality for a branch exists for a branch, it is not very likely that a new branch will be required for this communication connection. Values for this probability that a communication will soon need a new branch can be estimated from measurements of the reception level or, respectively, quality both in the branches currently employed as well as in the branches not currently employed, as well as from trend analyses.

Estimated values for cut-in blocking probabilities can be calculated from said quantities and the time slot for which this cut-in blocking probability is minimal can be determined. However, exact calculations are difficult and involved, so that heuristic methods are advantageous in the time slot selection.

Designations:
B plurality of branches,
N plurality of transmission and reception devices per branch,
$n_b(ts)$ plurality of occupied transmission and reception devices on the time slot ts at the branch b.
Rule 1:
select a time slot ts so that
 $K1=\max(n_b(ts))$
is minimal for b=1 . . . B.
Rule 2:
select a time slot so that $$K2 = \sum_{b=1}^{B}(n_b(ts))$$

is minimal.
Rule 3:
select a time slot ts whereby the plurality of communication connections that are serviced on this time slot is minimal, see FIG. 5.
Rule 4:
from measurements of the reception levels or qualities or, potentially, of the trend analysis, calculate estimated values for the probability that the $i^{th}$ communication connection on time slot ts soon additionally requires the branch b or, respectively, can release the branch b. These probabilities are referenced $W_b^{30}(ts)$ respective $W_b^{31}(Ls)$ The probability $ZBW_b(ts)$ that a required transmission and reception device for the corresponding time slot ts at this branch b is not available for an existing communication connection that needs the branch b can be calculated from these probabilities $W_b^{30}(ts)$ and $W_b^{31}(ts)$.

$ZBW(ts)=1-(1-ZBW_1(ts))^* \ldots *(1-ZBW_b(tS))^* \ldots *(1-ZBW_B(ts))$ thus derives for the cut-in blocking probability for the time slot ts.

Rule 4 consequently reads: select a time slot ts whereat ZBW(ts) is minimal.

Shortly [sic] indicates a time span for which reliable statements can be made about the development of communication connections. The order of magnitude can lie in the range from 1 . . . 5s, but is dependent on the speed of the mobile station and on the cell topology. The time span can be set as parameter in the system.

The time slot allocation strategy derives, for example (modifications for the purpose of a minimization of the blocking probabilities and potentially reduced outlay are just as possible):

Select time slot ts according to rule 1. When a plurality of time slots are selectable, then apply rule 2, etc. Alternatively, rule 4 or some other sequence of rules can also be applied respective one of the rule 1 through immediately and by itself.

Another possibility of minimizing the cut-in blocking possibility is a regrouping of communication connections, i.e. the shift to a different time slot ts.

The quantities according to rule 1 through 4 (only individual quantities therefrom as well) can be respectively compared to a threshold as trigger criteria. This can be checked at regular intervals or when a branch [sic] is required but is not available or when a transmission and reception device is released.

A call to be shifted is identified in that a check is carried out to see which is the communication connection that most greatly reduces the quantities according to rules 1 through 4. The selection of the time slot ts occurs as at the beginning of the communication connection. It can be provided that the relocation is only implemented when the quantities of the two time slots identified according to rule 1 through 4 differ by a threshold.

The setup blocking probability is simultaneously reduced by the application of the rules, particularly rules 1 and 2since the time slots are uniformly filled.

What is claimed is:

1. A method for covering a cell of a cellular mobile radiotelephone system, the method comprising the steps of:

providing at least one combination means for connection control of at least two base station branches having individual antennas, wherein the at least two base station branches are provided for the coverage of the cell;

monitoring, via the at least one combination means, individual transmission quality of each of the at least two base station branches for a respective communication connection between a mobile station and each of the at least two base station branches;

connecting and disconnecting, respectively and independently, the communication connection for each of the at least two base station branches via the combination means, in both transmission directions corresponding to the individual transmission quality, wherein a base station branch that was disconnected for a communication connection is added in on a different carrier frequency for a further communication connection;

using a time-division multiplex method on the communication connection;

controlling the connection and disconnection of each of the at least two base station branches based on a respective time slot; and allocating a time slot to the communication connection wherein a plurality of occupied transmission and reception devices in the time slot is minimal in a respective base station branch having the greatest plurality of occupied transmission and reception devices.

2. A method for covering a cell of a cellular mobile radiotelephone system, the method comprising the steps of:

providing at least one combination means for connection control of at least two base station branches having individual antennas, wherein the at least two base station branches are provided for the coverage of the cell;

monitoring, via the at least one combination means, individual transmission quality of each of the at least two base station branches for a respective communication connection between a mobile station and each of the at least two base station branches;

connecting and disconnecting, respectively and independently, the communication connection for each of the at least two base station branches via the combination means, in both transmission directions corresponding to the individual transmission quality, wherein a base station branch that was disconnected for a communication connection is added in on a different carrier frequency for a further communication connection;

using a time-division multiplex method on the communication connection;

controlling the connection and disconnection of each of the at least two base station branches based on a respective time slot; and relocating an already existing communication connection onto a selected time slot, wherein the communication connection that reduces cut-in blocking probability most is selected for relocation.

3. A method for covering a cell of a cellular mobile radiotelephone system, the method comprising the steps of:

providing at least one combination means for connection control of at least two base station branches having individual antennas, wherein the at least two base station branches are provided for the coverage of the cell;

monitoring, via the at least one combination means, individual transmission quality of each of the at least two base station branches for a respective communication connection between a mobile station and each of the at least two base station branches;

connecting and disconnecting, respectively and independently, the communication connection for each of the at least two base station branches via the combination means, in both transmission directions corresponding to the individual transmission quality, wherein a base station branch that was disconnected for a communication connection is added in on a different carrier frequency for a further communication connection;

using a time-division multiplex method on the communication connection;

controlling the connection and disconnection of each of the at least two base station branches based on a respective time slot; and allocating a time slot to the communication connection wherein an overall cut-in blocking probability of individual base station branches is minimal.

4. A method for covering a cell of a cellular mobile radiotelephone system, the method comprising the steps of:

providing at least one combination means for connection control of at least two base station branches having individual antennas, wherein the at least two base station branches are provided for the coverage of the the cell;

monitoring via the at least one combination means, individual transmission quality of each of the at least two base station branches for a first communication connection between a first mobile station and each of the at least two base station branches; and connecting and disconnecting, respectively and independently, the communication connection for each of the at least two base station branches via the combination means, in both transmission directions corresponding (to the individual transmission quality so that the number of base station branches used for a communication connection is dependent on the transmission quality, wherein a base station branch that was disconnected for a communication connection is added in on a different carrier frequency for a second communication connection which is operated simultaneously with the first communication connection.

5. A method for covering a cell of a cellular mobile radiotelephone system as claimed in claim 4, further comprising the steps of:

using a time-division multiplex method on the communication connection; and controlling the connection and disconnection of each of the at least two base station branches based on a respective time slot.

6. A method for covering a cell of a cellular mobile radiotelephone system as claimed in claim 5, further comprising the step of:

allocating a time slot to the communication connection wherein a plurality of occupied transmission and reception devices in the time slot is minimal in a respective base station branch.

7. A method for covering a cell of a cellular mobile radiotelephone system as claimed in claim 5, further comprising the step of:

allocating a time slot to the communication connection wherein a sum of occupied transmission and reception devices on all base station branches is minimal for the time slot.

8. A method for covering a cell of a cellular mobile radiotelephone system as claimed in claim 5, further comprising the step of:

allocating a time slot to the communication connection wherein a plurality of communication connections serviced on the time slot is minimal.

9. A base station for communication connections to a plurality of mobile stations via radio interfaces comprising:

at least one combination means;

at least two base station branches connected to the at least one combination means, the at least two base station branches having individual antennas for covering a cell;

means for monitoring individual transmission quality of each of the at least two base station branches for a first communication connection between a first mobile station and each of the at least two base station branches; and means for respectively and independently connecting and disconnecting the communication connection for each of the at least two base station branches in both transmission directions corresponding to the individual transmission quality so that the number of base station branches used for a communication connection is dependent on the transmission quality, wherein a base station branch that was disconnected for a communication connection is added in on a different carrier frequently for a second communication connection which is operated simultaneously with the first communication connection.

10. A base station as claimed in claim 9, wherein a regrouping of physical channels for the communication connection by the combination means is provided when the transmission quality of the communication connection is monitored over the at least two base station branches.

11. A base station as claimed in claim 9, further comprising:

at least one organization channel having a carrier frequency preferably used for communication connections covered by a plurality of base station branches.

12. A base station as claimed in claim 9, wherein the base station is operated according to a time-division multiplex method such that control of the connection and disconnection of a base station branch is related to a respective time slot.

13. A base station as claimed in claim 9, wherein the at least two base station branches are formed by base transmission/reception stations respectively arranged at an edge of the cell.

14. A base station as claimed in claim 9, wherein coverage of a mobile station by a plurality of base station branches during a time slot occurs on a common carrier frequency.

15. A base station as claimed in claim 9, wherein physical channels may be switched between the combination means and one of the at least two base station branches.

16. A base station as claimed in claim 9, wherein the at least two base station branches are formed by sector antennas to which different sectors of the cell are allocated.

17. A base station as claimed in claim 9, wherein transmission devices are arranged such that switching of a carrier frequency is enabled related to time slot.

18. A base station as claimed in claim 1, wherein monitoring of the transmission quality is cyclically repeated.

* * * * *